United States Patent [19]

Tzikas et al.

[11] Patent Number: 5,717,078
[45] Date of Patent: Feb. 10, 1998

[54] REACTIVE DYES, CONTAINING TWO TRIAZINYL RADICALS WHICH ARE BRIDGED VIA AN ALIPHATIC OR AROMATIC BRIDGE MEMBER

[75] Inventors: Athanassios Tzikas, Pratteln; Peter Aeschlimann, Allschwil, both of Switzerland

[73] Assignee: Ciba Specialty Chemicals Corporation, Tarrytown, N.Y.

[21] Appl. No.: 704,425

[22] Filed: Aug. 22, 1996

[30] Foreign Application Priority Data

Aug. 24, 1995 [CH] Switzerland ............ 2421/95

[51] Int. Cl.$^6$ .......... C09B 62/09; C09B 62/513; C09B 62/08; C09B 62/507; D06P 1/38
[52] U.S. Cl. .......... 534/634; 534/618; 534/617; 534/631; 534/632; 534/635; 534/642
[58] Field of Search ............ 534/634, 635

[56] References Cited

U.S. PATENT DOCUMENTS

| 4,841,028 | 6/1989 | Aeschlimann et al. ............ 534/629 |
| 5,182,371 | 1/1993 | Siegel et al. ............ 534/612 |
| 5,276,148 | 1/1994 | Siegel et al. ............ 534/605 |
| 5,428,140 | 6/1995 | Wiesenfeldt et al. ............ 534/588 |
| 5,449,762 | 9/1995 | Wiesenfeldt et al. ............ 534/612 |

FOREIGN PATENT DOCUMENTS

| 0458743 | 11/1991 | European Pat. Off. ............ 534/634 |
| 0625549 | 11/1994 | European Pat. Off. ............ 534/634 |
| 2085908 | 5/1982 | United Kingdom ............ 534/634 |

*Primary Examiner*—Floyd D. Higel
*Attorney, Agent, or Firm*—David R. Crichton; Kevin T. Mansfield

[57] ABSTRACT

Reactive dyes of the formula $$A_1-N \underset{N}{\overset{R_1}{\underset{\underset{X_1}{\|}}{\bigvee}}} N-\underset{R_2}{\overset{}{N}}-B_1-\underset{R_3}{\overset{}{N}} \underset{N}{\overset{}{\underset{\underset{X_2}{\|}}{\bigvee}}} N-A_2, \quad (1)$$

in which
$R_1$, $R_2$, $R_3$ and $R_4$ independently of one another are hydrogen or substituted or unsubstituted $C_1$–$C_4$alkyl,
$X_1$ and $X_2$ are halogen,
$B_1$ is an aromatic or aliphatic bridge member, or the radical of the formula —N($R_2$)—$B_1$—N($R_3$)— is a piperazine radical,
$A_1$ is the radical of a monoazo, polyazo, metal complex azo, anthraquinone, phthalocyanine, formazan or dioxazine chromophore and,
$A_2$ is a radical of the formula $$D_1-N=N-\underset{\underset{R_5\ O\ R_6}{\overset{}{N-C-N-alk-SO_2-Z,}}}{\bigcirc} \quad (2)$$

in which
$D_1$ is substituted or unsubstituted phenyl or naphthyl,
$R_5$ and $R_6$ independently of one another are hydrogen or substituted or unsubstituted $C_1$–$C_4$alkyl, alk is substituted or unsubstituted $C_2$–$C_6$alkylene and
Z is vinyl or a radical —$CH_2$—$CH_2$—$U_1$, and $U_1$ is a leaving group, and
the radicals $A_1$ and $A_2$ differ from one another,
are particularly suitable for dyeing or printing fibre materials containing hydroxyl groups or containing nitrogen. Dyeings with good fastness properties are obtained with a high tinctorial yield.

15 Claims, No Drawings

REACTIVE DYES, CONTAINING TWO TRIAZINYL RADICALS WHICH ARE BRIDGED VIA AN ALIPHATIC OR AROMATIC BRIDGE MEMBER

The present invention relates to novel reactive dyes, processes for their preparation and their use for dyeing or printing fibre materials.

The practice of dyeing using reactive dyes has recently led to increased requirements regarding the quality of the dyeings and the profitability of the dyeing process. Consequently, there continues to be a demand for novel reactive dyes which have improved properties, in particular in respect of application.

Reactive dyes which have an adequate substantivity and at the same time a good ease of washing out of the non-fixed portions are currently required for dyeing. They should furthermore have a good tinctorial yield and high reactivity, and dyeings with high degrees of fixing should be produced in particular. These requirements are not met in all properties by the known dyes.

The present invention is therefore based on the object of discovering novel, improved reactive dyes for dyeing and printing fibre materials which have the above characteristic qualities to a high degree. The novel dyes should be distinguished in particular by high fixing yields and high stabilities of the fibre-dye bond, and moreover the portions not fixed to the fibre should be easy to wash out. They should furthermore produce dyeings with good all-round fastness properties, for example light and wet fastness properties.

It has been found that the object described is largely achieved with the reactive dyes defined below.

The invention therefore relates to reactive dyes of the formula

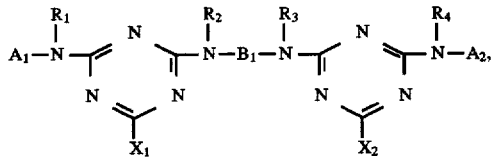

in which $R_1$, $R_2$, $R_3$ and $R_4$ independently of one another are hydrogen or substituted or unsubstituted $C_1$–$C_4$alkyl, $X_1$ and $X_2$ are halogen, $B_1$ is an aromatic or aliphatic bridge member, or the radical of the formula —N($R_2$)—$B_1$—N($R_3$)— is a piperazine radical, $A_1$ is the radical of a monoazo, polyazo, metal complex azo, anthraquinone, phthalocyanine, formazan or dioxazine chromophore and, $A_2$ is a radical of the formula

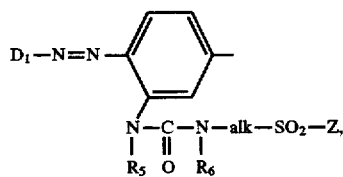

in which $D_1$ is substituted or unsubstituted phenyl or naphthyl, $R_5$ and $R_6$ independently of one another are hydrogen or substituted or unsubstituted $C_1$–$C_4$ alkyl, alk is substituted or unsubstituted $C_2$–$C_6$alkylene and Z is vinyl or a radical —$CH_2$—$CH_2$—$U_1$, and $U_1$ is a leaving group, and the radicals $A_1$ and $A_2$ differ from one another.

Alkyl radicals $R_1$, $R_2$, $R_3$, $R_4$, $R_5$ and $R_6$ in the reactive dye of the formula (1) are straight-chain or branched. The alkyl radicals can be further substituted, for example by hydroxyl, sulfo, sulfato, cyano or carboxyl. Examples are the following radicals: methyl, ethyl, propyl, isopropyl, butyl, isobutyl, sec-butyl or tert-butyl, and the corresponding radicals substituted by hydroxyl, sulfo, sulfato, cyano or carboxyl. Preferred substituents are hydroxyl, sulfo or sulfato, in particular hydroxyl or sulfato and preferably hydroxyl.

$R_1$, $R_4$, $R_5$ and $R_6$ are preferably hydrogen or $C_1$–$C_4$alkyl, in particular hydrogen.

$R_2$ and $R_3$ independently of one another are preferably hydrogen or $C_1$–$C_4$alkyl which is unsubstituted or substituted by hydroxyl, sulfo, sulfato, cyano or carboxyl. According to an interesting embodiment, one of the radicals $R_2$ and $R_3$ here is $C_1$–$C_4$alkyl which is substituted by hydroxyl, sulfo, sulfato, cyano or carboxyl and the other of the radicals $R_2$ and $R_3$ is hydrogen or $C_1$–$C_4$alkyl, in particular hydrogen.

$R_2$ and $R_3$ independently of one another are particularly preferably hydrogen or $C_1$–$C_4$alkyl, in particular hydrogen.

$X_1$ and $X_2$ independently of one another are preferably chlorine or fluorine, in particular fluorine.

The alkylene radical alk preferably contains no further substituents and is, in particular, a $C_2$–$C_3$alkylene radical, for example ethylene or 1,3-propylene.

The leaving group $U_1$ is, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N($C_1$–$C_4$alkyl)$_2$. $U_1$ is preferably a group of the formula —Cl, —$OSO_3H$, —$SSO_3H$, —OCO—$CH_3$,—OCO—$C_6H_5$ or —$OPO_3H_2$, in particular —Cl or —$OSO_3H$, and particularly preferably —$OSO_3H$.

Preferably, alk is a $C_2$–$C_3$alkylene radical and Z is vinyl or a radical of the formula —$CH_2$—$CH_2$—$OSO_3H$.

An aliphatic bridge member $B_1$ is, for example, a $C_2$–$C_{12}$alkylene radical, in particular a $C_2$–$C_6$alkylene radical, which can be interrupted by 1, 2 or 3 members from the group consisting of —NH—, —N($CH_3$)— or, in particular —O—, and is unsubstituted or substituted by hydroxyl, sulfo, sulfato, cyano or carboxyl. Preferred substituents of the alkylene radicals $B_1$ are hydroxyl, sulfo or sulfato, in particular hydroxyl.

Aliphatic bridge members $B_1$ are furthermore, for example, $C_5$–$C_9$cycloalkylene radicals, such as, in particular, cyclohexylene radicals. The cycloalkylene radicals mentioned can be unsubstituted or substituted by $C_1$–$C_4$alkyl, $C_1$–$C_4$alkoxy, $C_2$–$C_4$alkanoylamino, sulfo, halogen or carboxyl, in particular by $C_1$–$C_4$alkyl. Aliphatic bridge members $B_1$ are furthermore methylenecyclohexylene-methylene radicals which are unsubstituted or substituted in the cyclohexylene ring by $C_1$–$C_4$alkyl.

The piperazine radical of the formula —N($R_2$)—$B_1$—N($R_3$)— is, for example, a radical of the formula

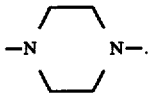

The aromatic bridge member $B_1$ is, for example, $C_1$–$C_6$alkylenephenylene or phenylene which are unsubstituted or substituted by $C_1$–$C_4$ alkyl, $C_1$–$C_4$alkoxy, $C_2$–$C_4$alkanoylamino, sulfo, halogen or carboxyl, or a radical of the formula

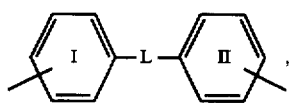 (3)

in which the benzene rings I and II are unsubstituted or substituted by $C_1$–$C_4$ alkyl, $C_1$–$C_4$ alkoxy, $C_2$–$C_4$ alkanoylamino, sulfo, halogen or carboxyl and L is a direct bond or a $C_2$–$C_{10}$ alkylene radical, which can be interrupted by 1, 2 or 3 oxygen atoms, or L is a bridge member of the formula —CH=CH—, —N=N—, —NH—, —CO—, —NH—CO—, —NH—CO—NH—, —O—, —S— or —SO$_2$—.

The aromatic bridge member $B_1$ is preferably phenylene, which can be substituted as defined above. The aromatic bridge members $B_1$ are preferably unsubstituted or substituted by sulfo.

$B_1$ is preferably a $C_2$–$C_{12}$ alkylene radical, which can be interrupted by 1, 2 or 3 members from the group consisting of —NH—, —N(CH$_3$)— or —O— and is unsubstituted or substituted by hydroxyl, sulfo, sulfato, cyano or carboxyl; or a $C_5$–$C_9$ cycloalkylene radical, $C_1$–$C_6$ alkylenephenylene radical or phenylene radical, which are unsubstituted or substituted by $C_1$–$C_4$ alkyl, $C_1$–$C_4$ alkoxy, $C_2$–$C_4$ alkanoylamino, sulfo, halogen or carboxyl;

or $B_1$ is a radical of the formula (3) in which the benzene rings I and II are unsubstituted or substituted by $C_1$–$C_4$ alkyl, $C_1$–$C_4$ alkoxy, $C_2$–$C_4$ alkanoylamino, sulfo, halogen or carboxyl and L is a direct bond or a $C_2$–$C_{10}$ alkylene radical, which can be interrupted by 1, 2 or 3 oxygen atoms, or L is a bridge member of the formula —CH=CH—, —N=N—, —NH—, —CO—, —NH—CO—, —NH—CO—NH—, —O—, —S— or —SO$_2$—;

or the radical of the formula —N(R$_2$)—B$_1$N(R$_3$)— is a piperazine radical of the formula

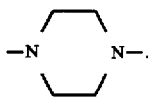

$B_1$ is particularly preferably a $C_2$–$C_{12}$ alkylene radical, which can be interrupted by 1, 2 or 3 members —O— and is unsubstituted or substituted by hydroxyl, sulfo, sulfato, cyano or carboxyl, or a phenylene radical which is unsubstituted or substituted by $C_1$–$C_4$ alkyl, $C_1$–$C_4$ alkoxy, $C_2$–$C_4$ alkanoylamino, sulfo, halogen or carboxyl.

$B_1$ is especially preferably a $C_2$–$C_{12}$ alkylene radical in particular a $C_2$–$C_6$ alkylene radical, which can be interrupted by 1, 2 or 3 members —O— and is unsubstituted or substituted by hydroxyl.

Bridge members $B_1$ which are of particular interest are $C_2$–$C_6$ alkylene radicals, in particular those of the formula —CH$_2$—CH(R$_7$) or —(R$_7$)—CH—CH$_2$—, in which R$_7$ is $C_1$–$C_4$ alkyl, in particular methyl.

The radical $A_1$ of a monoazo, polyazo, metal complex azo, anthraquinone, phthalocyanine, formazan or dioxazine chromophore in the reactive dye of the formula (1) can contain the substituents customary in organic dyes bonded to its basic structure.

Examples of substituents in the radical $A_1$ are: alkyl groups having 1 to 4 carbon atoms, such as methyl, ethyl, propyl, isopropyl or butyl, it being possible for the alkyl radicals to be further substituted, for example by hydroxyl, sulfo or sulfato; alkoxy groups having 1 to 4 carbon atoms, such as methoxy, ethoxy, propoxy, isopropoxy or butoxy, it being possible for the alkyl radicals to be further substituted, for example by hydroxyl, sulfo or sulfato; phenyl which is unsubstituted or substituted by $C_1$–$C_4$ alkyl, $C_1$–$C_4$ alkoxy, halogen, carboxyl or sulfo; acylamino groups having 1 to 8 carbon atoms, in particular such alkanoylamino groups, for example acetylamino or propionylamino; benzoylamino which is unsubstituted or substituted in the phenyl ring by $C_1$–$C_4$ alkyl, $C_1$–$C_4$ alkoxy, halogen or sulfo; phenylamino which is unsubstituted or substituted in the phenyl ring by $C_1$–$C_4$ alkyl, $C_1$–$C_4$ alkoxy, halogen or sulfo; N,N-di-β-hydroxyethylamino; N,N-di-β-sulfatoethylamino; sulfobenzylamino; N,N-disulfobenzylamino; alkoxycarbonyl having 1 to 4 carbon atoms in the alkoxy radical, such as methoxycarbonyl or ethoxycarbonyl; alkylsulfonyl having 1 to 4 carbon atoms, such as methylsulfonyl or ethylsulfonyl; trifluoromethyl; nitro; amino; cyano; halogen, such as fluorine, chlorine or bromine; carbamoyl; N-alkylcarbamoyl having 1 to 4 carbon atoms in the alkyl radical, such as N-methylcarbamoyl or N-ethylcarbamoyl; sulfamoyl; N-mono- or N,N-dialkylsulfamoyl having in each case 1 to 4 carbon atoms, such as N-methylsulfamoyl, N-ethylsulfamoyl, N-propylsulfamoyl, N-isopropylsulfamoyl or N-butylsulfamoyl, it being possible for the alkyl radicals to be further substituted, for example by hydroxyl or sulfo; N-(β-hydroxyethyl)sulfamoyl; N,N-di(β-hydroxyethyl)sulfamoyl; N-phenylsulfamoyl which is unsubstituted or substituted by $C_1$–$C_4$ alkyl, $C_1$–$C_4$ alkoxy, halogen, carboxyl or sulfo; ureido; hydroxyl; carboxyl; sulfomethyl or sulfo, as well as fibre-reactive radicals.

A group of suitable fibre-reactive radicals includes those of the formulae

 (4),

 (4a),

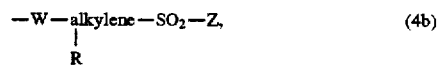 (4b)

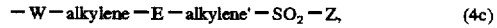 (4c)

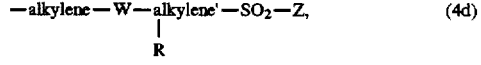 (4d)

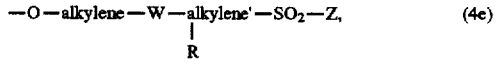 (4e)

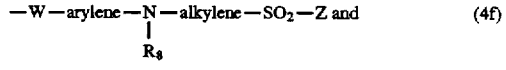 (4f)

 (4g)

in which

W is a group of the formula —SO$_2$—NR$_8$—, —CONR$_8$— or —NR$_8$CO—,

R$_8$ is hydrogen, $C_1$–$C_4$ alkyl which is unsubstituted or substituted by hydroxyl, sulfo, sulfato, carboxyl or cyano or a radical of the formula $$\begin{array}{c} \text{-alkylene-SO}_2-\text{Z,} \\ | \\ \text{R} \end{array}$$

R is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —$SO_2$—Z, Z is as defined above, Y is a radical of the formula —CH(Hal)—$CH_2$—Hal or —C(Hal)=$CH_2$ and Hal is halogen, E is the radical —O— or —$NR_{10}$, $R_{10}$ is hydrogen or $C_1$–$C_4$alkyl, alkylene and alkylene' independently of one another are $C_1$–$C_6$alkylene, arylene is a phenylene or naphthylene radical which is unsubstituted or substituted by sulfo, carboxyl, $C_1$–$C_4$alkyl, $C_1$–$C_4$alkoxy or halogen, $R_9$ is hydrogen or $C_1$–$C_4$alkyl which is unsubstituted or substituted by carboxyl, cyano, hydroxyl, sulfo or sulfato and X is a group which can be split off as an anion, and V is a radical of the formula

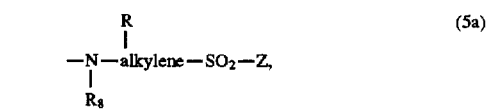 (5a)

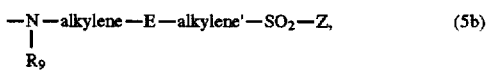 (5b)

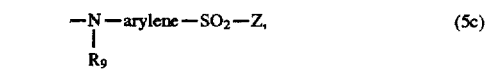 (5c)

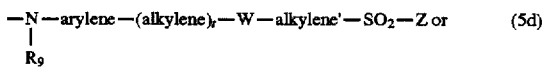 (5d)

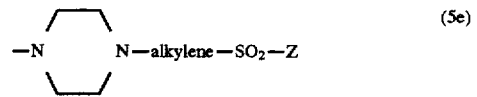 (5e)

in which

R, $R_8$, $R_9$, E, W, Z, alkylene, alkylene' and arylene are as defined above and t is 0 or 1.

Alkylene and alkylene' independently of one another are, for example, a methylene, ethylene, 1,3-propylene, 1,4-butylene, 1,5-pentylene or 1,6-hexylene radical or branched isomers thereof.

Alkylene and alkylene' are preferably a $C_1$–$C_4$alkylene radical, and particularly preferably an ethylene radical.

R is preferably hydrogen or the group —$SO_2$—Z, in which Z is as defined and preferred above. R is particularly preferably hydrogen.

$R_6$ is preferably hydrogen, $C_1$–$C_4$alkyl or a group -alkylene-$SO_2$—Z, in which alkylene and Z are in each case as defined above. $R_8$ is particularly preferably hydrogen or $C_1$–$C_4$alkyl, in particular hydrogen.

$R_9$ is preferably hydrogen or a $C_1$–$C_4$alkyl radical, and particularly preferably hydrogen.

Arylene is preferably a 1,3- or 1,4-phenylene radical, which is unsubstituted or substituted, for example by sulfo, methyl, methoxy or carboxyl.

E is preferably —NH—, and particularly preferably —O—.

W is preferably a group of the formula —NHCO— or, in particular, —CONH—.

X is, for example, fluorine, chlorine, bromine, sulfo, $C_1$–$C_4$alkylsulfonyl or phenylsulfonyl, and preferably fluorine or chlorine.

Hal is preferably chlorine or bromine, in particular bromine.

Other reactive groups of interest are those of the formula (4 g), in which V is a group which can be split off as an anion or a non-reactive substituent.

A group V which can be split off as an anion is, for example, fluorine, chlorine, bromine, sulfo, $C_1$–$C_4$alkylsulfonyl or phenylsulfonyl, and preferably fluorine or chlorine.

A non-reactive substituent V can be, for example, a hydroxyl, $C_1$–$C_4$alkoxy, $C_1$–$C_4$alkylthio, amino, N—$C_1$–$C_4$alkylamino or N,N-di-$C_1$–$C_4$alkylamino, where the alkyl is unsubstituted or substituted, for example by sulfo, sulfato, hydroxyl, carboxyl or phenyl, cyclohexylamino, morpholino, or an N—$C_1$–$C_4$alkyl-N-phenylamino or phenylamino or naphthylamino radical, in which the phenyl or naphthyl is unsubstituted or substituted, for example by $C_1$–$C_4$alkyl, $C_1$–$C_4$alkoxy, carboxyl, sulfo or halogen.

Examples of suitable non-reactive substituents V are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxyl.

The non-reactive substituent V is preferably amino, N—$C_1$–$C_4$alkylamino, which is unsubstituted in the alkyl part or substituted by hydroxyl, sulfato or sulfo, morpholino, phenylamino or N—$C_1$–$C_4$ alkyl-N-phenylamino, in which the phenyl is in each case unsubstituted or substituted by sulfo, carboxyl, methyl or methoxy. Phenylamino or N—$C_1$–$C_4$alkyl-N-phenylamino, in which the phenyl is in each case unsubstituted or substituted by sulfo, carboxyl, methyl or methoxy, are particularly preferred.

Particularly preferred fibre-reactive radicals are those of the formula (4 g) or, in particular, of the formula (4a).

The radical $A_1$ of a monoazo, polyazo or metal complex azo chromophore is, in particular, one of the following:

Chromophore radicals of a mono- or disazo dye of the formula

 (6)

or

 (7), in which

D is the radical of a diazo component of the benzene or naphthalene series,

M is the radical of a middle component of the benzene or naphthalene series,

K is the radical of a coupling component of the benzene, naphthalene, pyrazolone, 6-hydroxy-2-pyridone or acetoacetic acid arylamide series and u is the number 0 or 1, it being possible for D, M and K to carry the substituents customary in azo dyes, for example $C_1$–$C_4$alkyl or $C_1$–$C_4$alkoxy which are unsubstituted or further substituted by hydroxyl, sulfo or sulfato, halogen, carboxyl, sulfo, nitro, cyano, trifluoromethyl, sulfamoyl, carbamoyl, amino, ureido, hydroxyl, carboxyl, sulfomethyl, $C_2$–$C_4$alkanoylamino, benzoylamino which is unsubstituted or substituted in the phenyl ring by $C_1$–$C_4$alkyl, $C_1$–$C_4$alkoxy, halogen or sulfo, phenyl which is unsubstituted or substituted by $C_1$–$C_4$alkyl, $C_1$–$C_4$alkoxy, halogen, carboxyl or sulfo, and fibre-reactive radicals. The metal complexes derived from the dye radicals of the formulae (6) and (7) are also suitable, these being, in particular, dye radicals of 1:1 copper complex azo dye of the benzene or naphthalene series in which the copper atom is bonded in each case to a metallizable group, for example a hydroxyl group, on both sides in the ortho-position relative to the azo bridge. If the chromophore radicals of the formula (6) or (7) carry a reactive radical, this preferably has the formula (4 g) defined above, or, in particular the formula (4a).

The radicals of the formulae (6) and (7) are preferably those of the formula

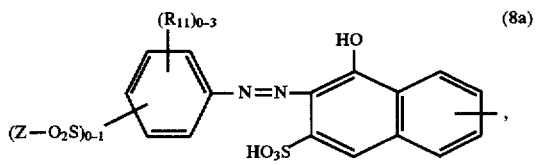 (8a)

in which ($R_{11}$)$_{0-3}$ is 0 to 3 identical or different substituents from the group consisting of $C_1$–$C_4$alkyl, $C_1$–$C_4$alkoxy, halogen, carboxyl and sulfo and Z is as defined above,

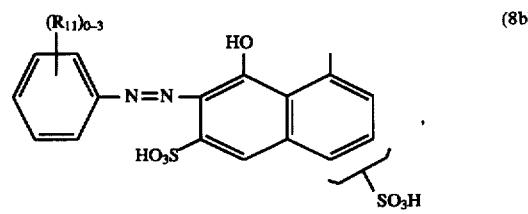 (8b)

in which ($R_{11}$)$_{0-3}$ is as defined above,

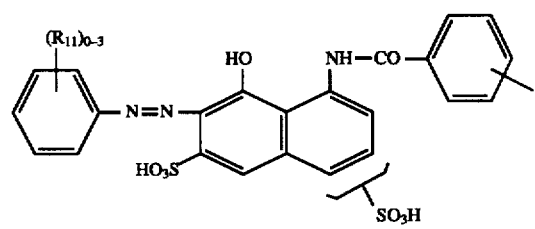 (8c)

in which ($R_{11}$)$_{0-3}$ is as defined above,

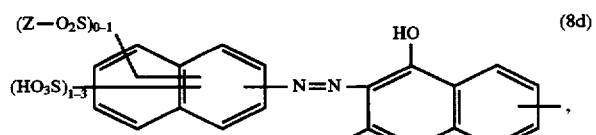 (8d)

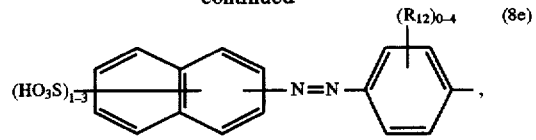 (8e)

in which ($R_{12}$)$_{0-4}$ is 0 to 4 identical or different substituents from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo and Z is as defined above,

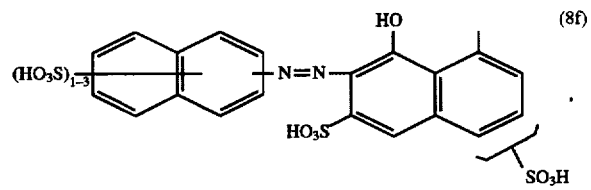 (8f)

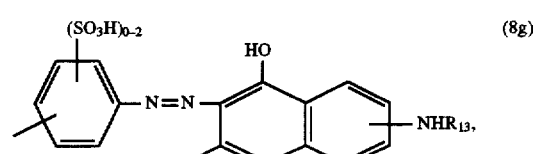 (8g)

in which $R_{13}$ is $C_1$–$C_4$alkanoyl, benzoyl or a halotriazinyl radical which is unsubstituted or further substituted,

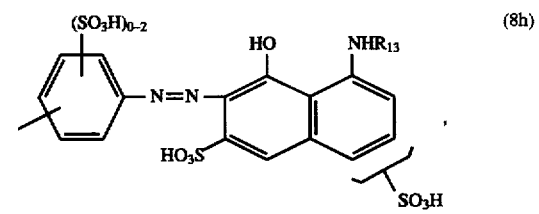 (8h)

in which $R_{13}$ is $C_1$–$C_4$alkanoyl, benzoyl or a halotriazinyl radical which is unsubstituted or further substituted,

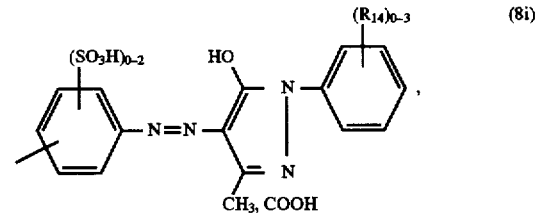 (8i)

in which ($R_{14}$)$_{0-3}$ is 0 to 3 identical or different substituents from the group consisting of $C_1$–$C_4$alkyl, $C_1$–$C_4$alkoxy, halogen, carboxyl and sulfo,

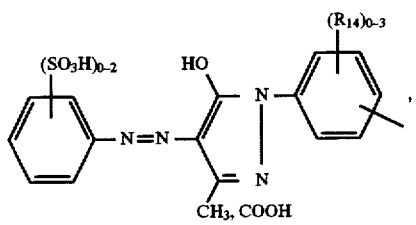

(8j)

in which $(R_{14})_{0-3}$ is as defined above,

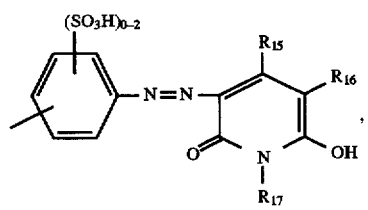

(8k)

in which $R_{15}$ and $R_{17}$ independently of one another are hydrogen, $C_1$–$C_4$alkyl or phenyl, and $R_{16}$ is hydrogen, cyano, carbamoyl or sulfomethyl,

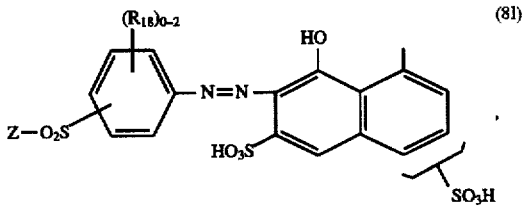

(8l)

in which $(R_{18})_{0-2}$ is 0 to 2 identical or different substituents from the group consisting of $C_1$–$C_4$alkyl, $C_1$–$C_4$alkoxy, halogen, carboxyl and sulfo, and Z is as defined above.

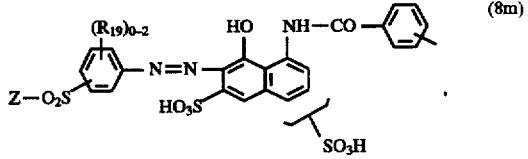

(8m)

in which $(R_{19})_{0-2}$ is 0 to 2 identical or different substituents from the group consisting of $C_1$–$C_4$alkyl, $C_1$–$C_4$alkoxy, halogen, carboxyl and sulfo; and Z is as defined above,

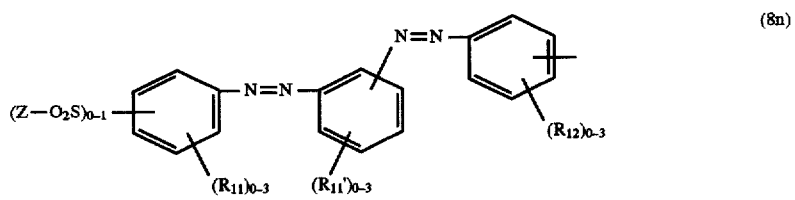

(8n)

or

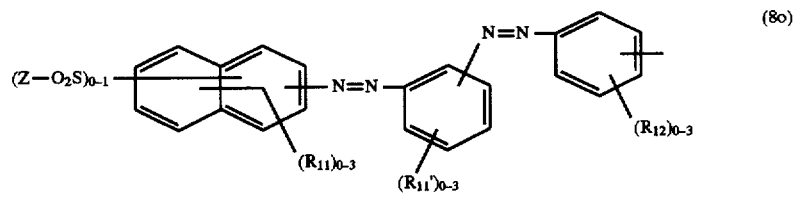

(8o)

or

-continued

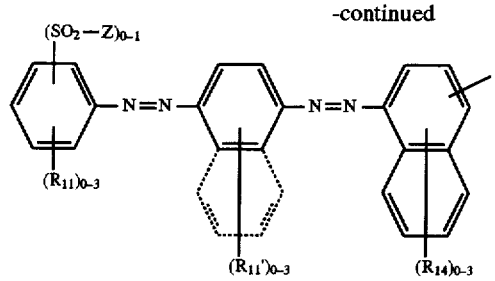
(8p)

or

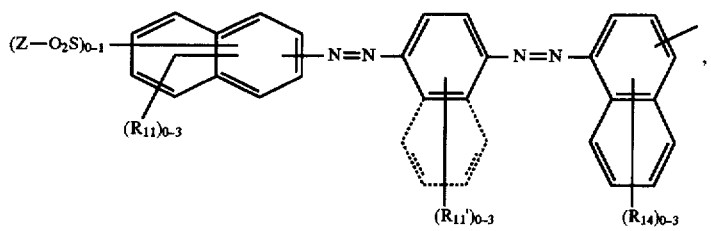
(8q)

in which $(R_{11})_{0-3}$, $(R_{12})_{0-3}$, $(R_{14})_{0-3}$ and Z are in each case as defined above and $(R_{11}')_{0-3}$ is 0 to 3 identical or different substituents from the group consisting of $C_1$–$C_4$alkyl, $C_1$–$C_4$alkoxy, halogen, carboxyl and sulfo.

Halotriazinyl radicals which are unsubstituted or further substituted are, in particular, those of the formula (4 g) defined above.

The radical of a formazan chromophore is preferably one of the formula

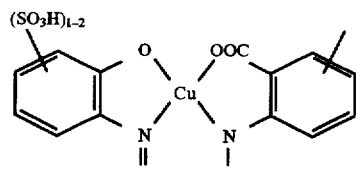
(8r)

or

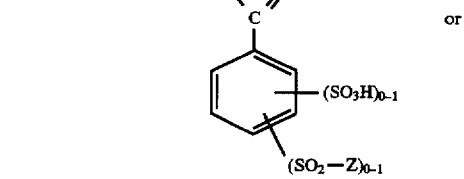
(8s)

in which

Z is as defined above and the benzene nuclei contain no further substituents or are further substituted by $C_1$–$C_4$alkyl, $C_1$–$C_4$alkoxy, $C_1$–$C_4$alkylsulfonyl, halogen or carboxyl.

The radical of a phthalocyanine chromophor is preferably one of the formula

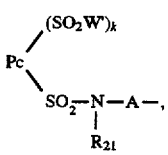
(9)

in which

Pc is the radical of a metal phthalocyanine, in particular the radical of a copper or nickel phthalocyanine;

W' is —OH and/or —$NR_{20}R_{20}'$;

$R_{20}$ and $R_{20}'$ independently of one another are hydrogen or $C_1$–$C_4$alkyl which is unsubstituted or substituted by hydroxyl or sulfo;

$R_{21}$ is hydrogen or $C_1$–$C_4$alkyl;

A is a phenylene radical which is unsubstituted or substituted by $C_1$–$C_4$alkyl, halogen, carboxyl or sulfo, or a $C_2$–$C_6$alkylene radical; and k is 1 to 3.

The radical of a dioxazine chromophore is preferably one of the formula

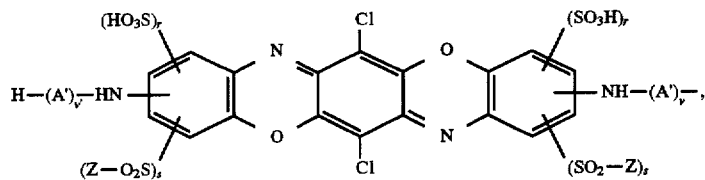 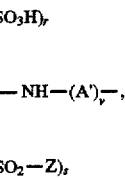

in which
- A' is a phenylene radical which is unsubstituted or substituted by $C_1$-$C_4$alkyl, halogen, carboxyl or sulfo, or a $C_2$-$C_6$alkylene radical,
- r, s, v and v' independently of one another are each the number 0 or 1 and
- Z is as defined above.

The radical of an anthraquinone chromophore is preferably one of the formula

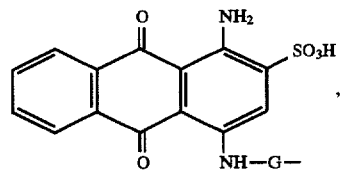

in which
G is a phenylene radical which is unsubstituted or substituted by $C_1$-$C_4$alkyl, $C_1$-$C_4$alkoxy, halogen, carboxyl or sulfo, or a cyclohexylene, phenylenemethylene or $C_2$-$C_6$alkylene radical.

The radical $A_1$ is preferably a radical of the formulae (8a) to (8q) or a radical of the formula (11), in particular those radicals of the formulae (8a) to (8q), which contain no fibre-reactive radical. Radicals which are of particular interest are those of the formulae (8a), (8d), (8e), (8i), (8k), (8n), (8o), (8p) and (8q), in particular the radicals of the formulae (8a), (8d), (8e) and (8n) to (8q).

The radicals $A_1$ and $A_2$ preferably in each case contain at least one sulfo group, in particular 1 to 4 sulfo groups, and preferably 1 to 3 sulfo groups.

Preferred radicals $D_1$ are phenyl or naphthyl which are unsubstituted or substituted by $C_1$-$C_4$alkyl, $C_1$-$C_4$alkoxy, $C_2$-$C_4$alkanoylamino, sulfo, halogen, carboxyl or a fibre-reactive radical.

Fibre-reactive radicals in the radical $D_1$ are, for example, the fibre-reactive radicals defined above as substituents of the radical $A_1$, the above preferences applying. Particularly preferred fibre-reactive radicals in the radical $D_1$ are those of the formulae (4) and (4a).

$D_1$ is particularly preferably phenyl or napthyl which are unsubstituted or substituted by $C_1$-$C_4$alkyl, $C_1$-$C_4$alkoxy, $C_2$-$C_4$alkanoylamino, sulfo, halogen or carboxyl. $D_1$ is especially preferably phenyl or naphthyl which are substituted by $C_1$-$C_4$alkyl, $C_1$-$C_4$alkoxy, sulfo or halogen, in particular phenyl or naphthyl which are substituted by sulfo. The corresponding phenyl radicals are of particular interest as radicals $D_1$.

Preferred reactive dyes of the formula (1) are those in which
- $R_1$, $R_2$, $R_3$, $R_4$, $R_5$ and $R_6$ independently of one another are hydrogen or $C_1$-$C_4$alkyl which is unsubstituted or substituted by hydroxyl, sulfo, sulfato, cyano or carboxyl,
- $X_1$ and $X_2$ are chlorine or, in particular, fluorine,
- $B_1$ is a $C_2$-$C_{12}$alkylene radical, which can be interrupted by 1, 2 or 3 members —O— and is unsubstituted or substituted by hydroxyl,
- Z is vinyl or a radical of the formula —$CH_2$—$CH_2$—$OSO_3H$, and
- $D_1$ is phenyl or naphthyl which are unsubstituted or substituted by $C_1$-$C_4$alkyl, $C_1$-$C_4$alkoxy, $C_2$-$C_4$alkanoylamino, sulfo, halogen, carboxyl or a fibre-reactive radical, in particular phenyl or naphthyl which are unsubstituted or substituted by $C_1$-$C_4$alkyl, $C_1$-$C_4$alkoxy, $C_2$-$C_4$alkanoylamino, sulfo, halogen or carboxyl.

The radical $A_1$ here is as defined and preferred above.

Particularly preferred reactive dyes of the formula (1) are those in which
- $R_1$, $R_2$, $R_3$, $R_4$, $R_5$ and $R_6$ are hydrogen,
- $X_1$ and $X_2$ are chlorine or, in particular, fluorine,
- $B_1$ is a radical of the formula —$CH_2$—$CH(R_7)$— or —$(R_7)$—$CH$—$CH_2$—, in which $R_7$ is $C_1$-$C_4$alkyl,
- alk is a $C_2$-$C_3$alkylene radical,
- Z is vinyl or a radical of the formula —$CH_2$—$CH_2$—$OSO_3H$, and
- $D_1$ is phenyl or naphthyl which are unsubstituted or substituted by $C_1$-$C_4$alkyl, $C_1$-$C_4$alkoxy, $C_2$-$C_4$alkanoylamino, sulfo, halogen, carboxyl or a fibre-reactive radical, in particular phenyl or naphthyl which are unsubstituted or substituted by $C_1$-$C_4$alkyl, $C_1$-$C_4$alkoxy,
- $C_2$-$C_4$alkanoylamino, sulfo, halogen or carboxyl, and preferably phenyl or naphthyl which are substituted by sulfo.

The radical $A_1$ here is as defined and preferred above.

A group of interesting reactive dyes of the formula (1) comprises those in which
- $B_1$ is a radical of the formula —$CH_2$—$CH(R_7)$— or —$(R_7)$—$CH$—$CH_2$—, in which
- $R_7$ is as defined and preferred above, or preferably those reactive dyes of the formula (1) in which one of the radicals $R_2$ and $R_3$ is $C_1$-$C_4$alkyl which is substituted by hydroxyl, sulfo, sulfato, cyano or carboxyl and the other of the radicals $R_2$ and $R_3$ is hydrogen or $C_1$-$C_4$alkyl, in particular hydrogen.

The present invention furthermore relates to a process for the preparation of reactive dyes of the formula (1), which comprises subjecting a compound of the formula

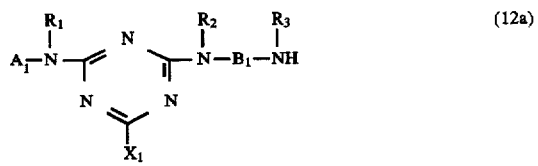

to a condensation reaction with a compound of the formula

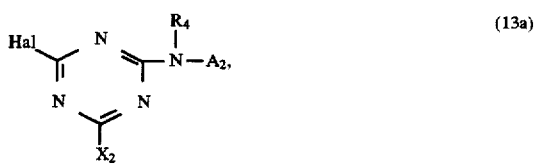 (13a)

or subjecting a compound of the formula

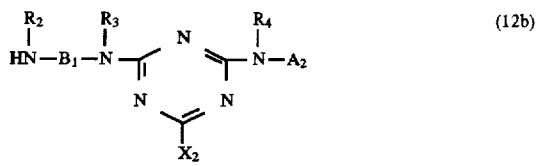 (12b)

to a condensation reaction with a compound of the formula

 (13b)

in which

Hal is halogen, Preferably chlorine or fluorine, and $A_1, A_2, B_1, X_1, X_2, R_1, R_2, R_3$ and $R_4$ are as defined under formula (1).

The compounds of the formulae (12a), (12b), (13a) and (13b) are known or can be obtained analogously to known compounds.

Thus, compounds of the formulae (13a) and (13b) can be obtained by condensation of compounds of the formula $A_2$—$NHR_4$ or $A_1$—$NHR_1$ with cyanuric chloride or cyanuric fluoride. Compounds of the formula (12a) and (12b) can be obtained by subjecting a compound of the formula (13a) or (13b) to a condensation reaction with a diamine of the formula $R_2$—HN—$B_1$—NH—$R_3$, an excess of the diamine being used, if appropriate. Compounds of the formula $A_1$—$NHR_1$ can be obtained, for example, by the processes described in U. S. Pat. No. 4,841,028.

The individual condensation reactions can be carried out by processes known per se, for example the processes described in GB-A-2,085,908. As a rule, the condensation reactions are carried out in aqueous solution at a temperature of, for example, 0° to 50° C. and a pH of, for example, 4 to 9.

The reactive dyes of the formula (1) according to the invention which contain a sulfo or sulfato group are either in the form of their free acid or, preferably, in the form of salts thereof. Salts are, for example, the alkali metal, alkaline earth metal or ammonium salts or the salts of an organic amine. Examples are the sodium, lithium, potassium or ammonium salts or the salt of mono-,di- or triethanolamine.

The reactive dyes according to the invention are suitable for dyeing and printing widely varying materials, such as fibre materials containing hydroxyl groups or containing nitrogen. Examples are silk, leather, wool, polyamide fibres and polyurethanes, and in particular all types of cellulosic fibre materials. Such cellulosic fibre materials are, for example, the natural cellulosic fibres, such as cotton, linen and hemp, as well as cellulose and regenerated cellulose.

The dyes according to the invention are also suitable for dyeing or printing fibres containing hydroxyl groups which are contained in blend fabrics, for example mixtures of cotton with polyester fibres or polyamide fibres. The dyes according to the invention are particularly suitable for dyeing or printing cellulosic fibre materials. They can furthermore be used for dyeing or printing natural or synthetic polyamide fibre materials.

The dyes according to the invention can be applied in a tinctorially effective amount to the fibre material and fixed to the fibre in various ways, in particular in the form of aqueous dye solutions and printing pastes. They are suitable both for the exhaust method and for dyeing by the pad-dyeing method, in which the goods are impregnated with aqueous dye solutions, which may contain salts, and the dyes are fixed, if appropriate under the action of heat, after an alkali treatment or in the presence of alkali. They are particularly suitable for the so-called cold pad-batch process, in which the dye is applied on the pad together with the alkali and is then fixed by storage at room temperature for several hours. After the fixing, the dyeings or prints are rinsed thoroughly with cold and hot water, if appropriate with the addition of a dispersing agent.

The dyes according to the invention are distinguished by high reactivity, good fixing capacity and a very good build-up capacity. They can therefore be employed by the exhaust dyeing method at low dyeing temperatures and require only short steaming times in the pad-steam method. The degrees of fixing are high and the non-fixed portions can easily be washed out, the difference between the degree of exhaustion and degree of fixing being remarkably low, i.e. the soaping loss is very low. The dyes according to the invention are also particularly suitable for printing, in particular on cotton, but likewise also for printing fibres containing nitrogen, for example wool or silk or blend fabrics which comprise wool or silk.

The dyeings and prints produced with the dyes according to the invention have a high colour strength and a high stability of the fibre-dye bond, both in the acid and in the alkaline range, and furthermore good light fastness properties and very good wet fastness properties, such as fastnesses to washing, water, saltwater, cross-dyeing and perspiration, as well as a good fastness to pleating, fastness to ironing and fastness to rubbing.

The following examples serve to illustrate the invention. The temperatures are stated in degrees Celsius, parts are parts by weight and the percentage data relate to percentages by weight, unless stated otherwise. Parts by weight bear the same relation to parts by volume as the kilogram to the liter.

EXAMPLE 1 a) 101.2 parts of aniline-2,4-disulfonic acid are diazotized in 400 parts of water with 100 parts of concentrated hydrochloric acid at a temperature of 0° to 2° C. with 125 parts of a 4 normal aqueous sodium nitrite solution. After a stirring time of 15 minutes, the excess nitrite is destroyed by addition of sulfamic acid. This suspension is added to 147 parts of an amine which, in the form of the free acid, is the compound of the formula

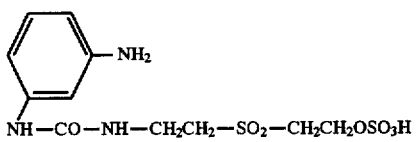

and coupling is carried out at a pH of 2 to 3 and a temperature of 0° to 5° C. When the coupling has ended, the pH is raised to a value of 7 and stabilized by addition of sodium dihydrogen phosphate buffer.

The solution is cooled to a temperature of 0° C., a little ice is added, 56.7 parts of cyanuric fluoride are slowly added dropwise, while stirring intensively, and a pH of 7 is maintained by metering in 5 normal aqueous sodium hydroxide solution. 44.4 parts of 1,2-diaminopropane as the dihydrochloride are added to this acylation product and the pH is raised to 5,5 to 6. The temperature is allowed to rise to 20° C. and the mixture is subsequently stirred at 30° C. for a further hour. 10% of sodium chloride is added to the reaction solution and the dye which has precipitated out is filtered off and washed free from excess amine with aqueous sodium chloride solution. A compound which, in the form of the free acid, has the formula

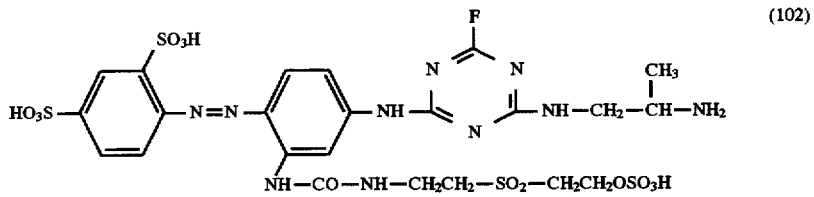

is obtained, b) 6,06 parts of an amine which, in the form of the free acid, has the formula

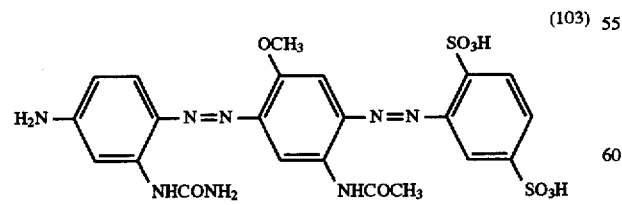

are dissolved in water at a neutral pH and the solution is cooled to a temperature of 0° C. After addition of a phosphate buffer and a small amount of a surfactant, 1.5 parts of cyanuric fluoride am added dropwise to the solution thus obtained, while stirring intensively. After the reaction, which has ended immediately, 8.1 parts of the compound of the formula (102) obtainable according to Example 1a) are added, the pH is brought to a value of 7,5 to 8 and the temperature is increased slowly from 20° to 30° C. The pH is kept constant by addition of a 2 normal aqueous sodium hydroxide solution. A brown solution is obtained, and, when the reaction has ended, is dialysed and freeze-dried in the customary manner. A dye which, in the form of the free acid, is the compound of the formula

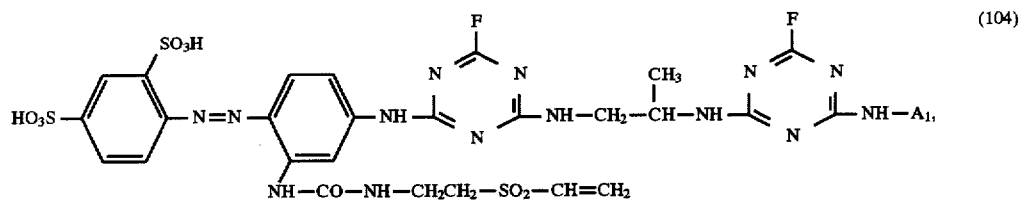

in which $A_1$ is a radical of the formula

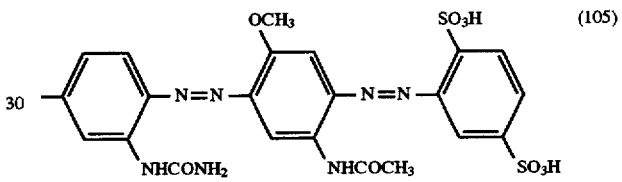

is obtained. The dye of the formula (104) dyes cotton in an orange shade.

EXAMPLES 2 to 39

The procedure described in Example 1 is repeated, but using an equimolar amount of one of the amines shown in column 2 in the following Table 1 instead of 6.06 parts of an amine of the formula (103). Analogous dyes which dye cotton in the colour shades shown in column 3 in Table 1 are obtained.

TABLE 1

| Ex. | Amine | Colour shade on cotton |
|---|---|---|
| 2 | (structure: $H_2N$-phenyl(NHCONH$_2$)-N=N-phenyl(SO$_3$H)-N=N-phenyl-SO$_3$H) | orange |
| 3 | (structure: pyridone with $H_2NCO$, $CH_3$, $C_2H_5$, OH, N=N-phenyl(SO$_3$H)(NH$_2$)) | yellow |
| 4 | (structure: pyridone with $HO_3S$–$CH_2$, $CH_3$, $C_2H_5$, OH, N=N-phenyl(SO$_3$H)(NH$_2$)) | yellow |
| 5 | (structure: pyrazole with HOOC, OH, N=N-phenyl(SO$_3$H)(NH$_2$), N-phenyl-SO$_3$H) | yellow |
| 6 | (structure: pyrazole with $H_3C$, OH, N=N-phenyl(SO$_3$H)(NH$_2$), N-(2,5-dichloro-4-sulfophenyl)) | yellow |
| 7 | (structure: pyrazole with HOOC, OH, N=N-phenyl(SO$_3$H)(NH$_2$), N-(2,5-disulfophenyl)) | yellow |

TABLE 1-continued

| Ex. | Amine | Colour shade on cotton |
|---|---|---|
| 8 | (structure) | yellow |
| 9 | (structure) | yellow |
| 10 | (structure) | yellow |
| 11 | (structure) | yellow |
| 12 | (structure) | golden yellow |
| 13 | (structure) | golden yellow |
| 14 | (structure) | golden yellow |

TABLE 1-continued
| Ex. | Amine | Colour shade on cotton |
|---|---|---|
| 15 | 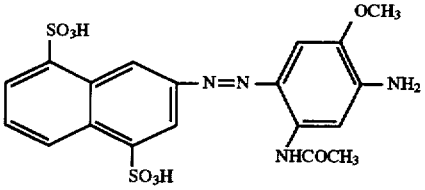 | yellowish-tinged red |
| 16 | 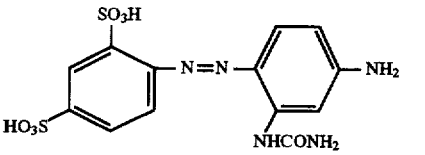 | yellow |
| 17 | 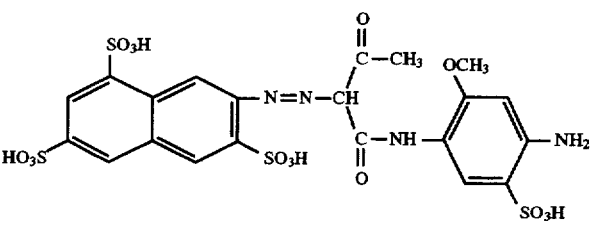 | yellow |
| 18 | 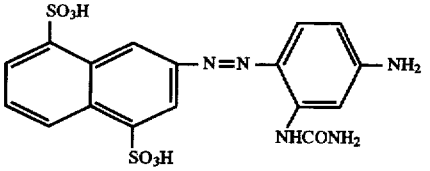 | yellow |
| 19 | 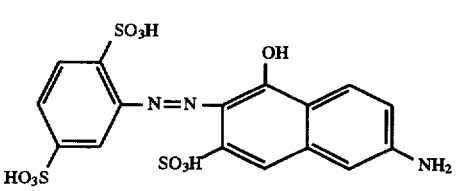 | yellowish-tinged orange |
| 20 | 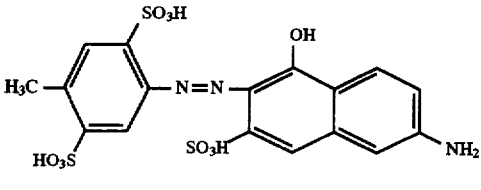 | orange |
| 21 | 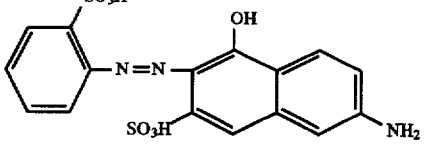 | orange |
| 22 | 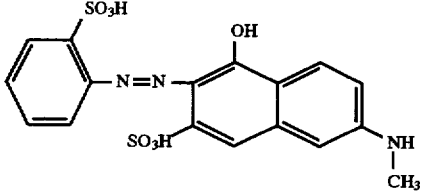 | yellowish-tinged orange |

TABLE 1-continued

| Ex. | Amine | Colour shade on cotton |
|---|---|---|
| 23 | (structure: 1,5-disulfonaphthalene-2-azo-1-hydroxy-3-sulfo-6-amino-naphthalene) | yellowish-tinged orange |
| 24 | (structure: 8-vinylsulfonyl-6-sulfo-naphth-2-yl-azo-1-hydroxy-3-sulfo-6-amino-naphthalene) | yellowish-tinged orange |
| 25 | (structure: 1,5-disulfonaphthalene-2-azo-1-hydroxy-3-sulfo-6-(N-methylamino)-naphthalene) | yellowish-tinged orange |
| 26 | (structure: 4-vinylsulfonylphenyl-azo-1-hydroxy-3-sulfo-6-amino-naphthalene) | yellowish-tinged orange |
| 27 | (structure: 2,5-disulfophenyl-azo-2,5-dimethyl-phenyl-azo-4-amino-8-sulfo-naphthalene) | brown |
| 28 | (structure: 4,6,8-trisulfonaphth-2-yl-azo-phenyl-azo-4-amino-phenyl) | brown |
| 29 | (structure: 4,6,8-trisulfonaphth-2-yl-azo-3-methyl-phenyl-azo-4-amino-phenyl) | brown |
| 30 | (structure: 2,5-disulfophenyl-azo-2,5-dimethyl-phenyl-azo-4-amino-2-ureido-phenyl) | brown |

TABLE 1-continued

| Ex. | Amine | Colour shade on cotton |
|---|---|---|
| 31 | | brown |
| 32 | | brown |
| 33 | | brown |
| 34 | | brown |
| 35 | | yellowish-tinged red |
| 36 | | olive |

TABLE 1-continued

| Ex. | Amine | Colour shade on cotton |
|---|---|---|
| 37 | 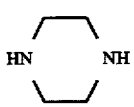 | olive green |
| 38 | 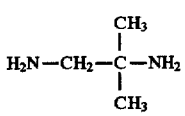 | olive green |
| 39 | 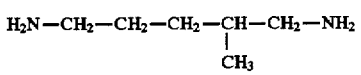 | olive green |

The procedure described in Example 1 is repeated, but using an equimolar amount of one of the following diamines instead of 44.4 pads of 1,2-diaminopropane. Analogous dyes are obtained:

Diamine

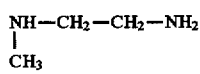
NH—CH$_2$—CH$_2$—NH$_2$
|
CH$_3$

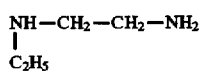
NH—CH$_2$—CH$_2$—NH$_2$
|
C$_2$H$_5$

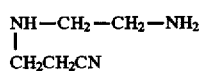
NH—CH$_2$—CH$_2$—NH$_2$
|
CH$_2$CH$_2$CN

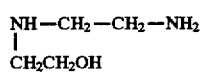
NH—CH$_2$—CH$_2$—NH$_2$
|
CH$_2$CH$_2$OH

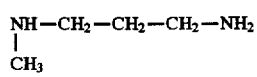
NH—CH$_2$—CH$_2$—CH$_2$—NH$_2$
|
CH$_3$

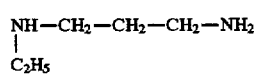
NH—CH$_2$—CH$_2$—CH$_2$—NH$_2$
|
C$_2$H$_5$

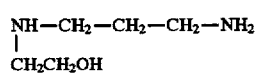
NH—CH$_2$—CH$_2$—CH$_2$—NH$_2$
|
CH$_2$CH$_2$OH

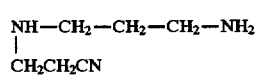
NH—CH$_2$—CH$_2$—CH$_2$—NH$_2$
|
CH$_2$CH$_2$CN

-continued

Diamine

HN⟨ ⟩NH (piperazine)

H$_2$N—CH$_2$—C(CH$_3$)$_2$—NH$_2$

H$_2$N—CH$_2$—CH$_2$—CH$_2$—CH(CH$_3$)—CH$_2$—NH$_2$

H$_2$N—(CH$_2$)$_2$—O—(CH$_2$)$_2$—O—(CH$_2$)$_2$—NH$_2$

Analogous dyes are obtained if the procedure in one of Examples 2 to 39 is repeated, but using an equimolar amount of one of the above diamines instead of 44.4 parts of 1,2-diaminopropane.

EXAMPLE 40 a) 101.2 parts of aniline-2,4-disulfonic acid are diazotized in 400 parts of water with 100 parts of concentrated hydrochloric acid at a temperature of 0° to 2° C. with 125 parts of an aqueous 4 normal sodium nitrite solution. After a stirring time of 15 minutes, the excess nitrite is destroyed by addition of sulfamic acid. This suspension is added to 160 parts of an amine which, in the form of the free acid, is the compound of the formula

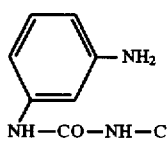
(101)

and coupling is carried out at a pH of 2 to 3 and a temperature of 0 to 5° C. When the coupling has ended, the pH is raised to a value of 7 and stabilized by addition of sodium dihydrogen phosphate buffer.

The solution is cooled to a temperature of 0° C., a little ice is added and a suspension of 77.5 parts of cyanuric chloride in 200 parts of ice-water is allowed to run in at a temperature of 0° to 5° C., while stirring intensively. The pH here is kept constant at a value of 5.5 by metering in aqueous sodium carbonate solution. 44.4 parts of 1,2-diaminopropane as the dihydrochloride are added to this acylation product and the pH is raised to 5.5 to 6. During the condensation, the temperature is allowed to rise slightly and the mixture is subsequently stirred at 30° C. for a further hour. 10% of sodium chloride are added to the reaction mass and the dye which has precipitated out is filtered off and washed free from excess amine with aqueous sodium chloride solution. A compound which, in the form of the free acid, has the formula

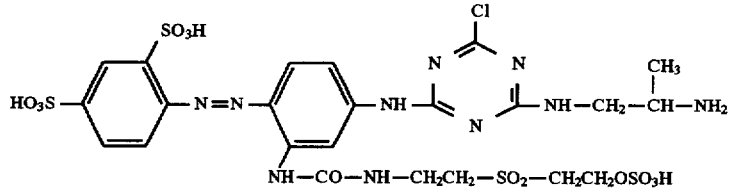
(106)

is obtained.

b) 6.06 parts of an amine which, in the form of the free acid, has the formula

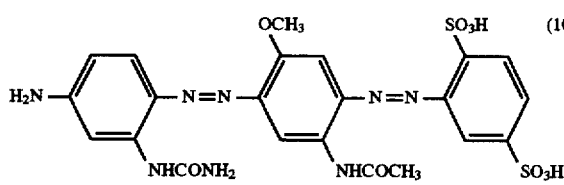
(103)

are dissolved in water at a neutral pH and the solution is cooled to a temperature of 0° C. After addition of a phosphate buffer and a small amount of a surfactant, the solution thus obtained is added dropwise to an ice-cold suspension of 1.9 parts of cyanuric chloride in water, while stirring intensively. When the reaction has ended, 8.1 parts of the compound of the formula (106) obtainable according to Example 40a) are added, the pH is brought to a value of 8.5 to 9 and the temperature is increased slowly from 20° to 30° C. The pH is kept constant by addition of a 2 normal aqueous sodium hydroxide solution. A solution is obtained and, when the reaction has ended, is dialysed and freeze-dried in the customary manner. A dye which, in the form of the free acid, is the compound of the formula

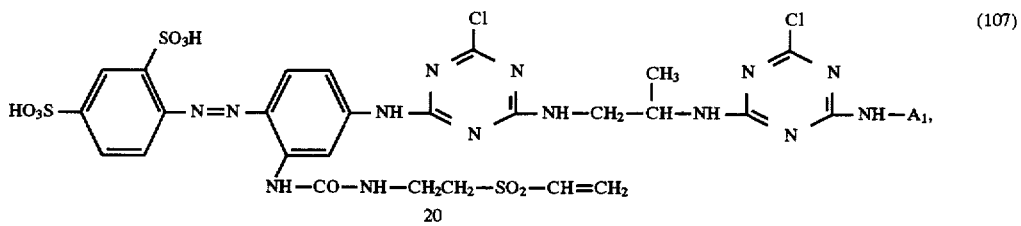
(107)

in which

A₁ is a radical of the formula

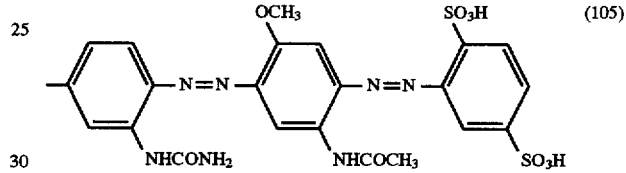
(105)

is obtained. The dye of the formula (107) dyes cotton in an orange shade.

EXAMPLES 41 to 78

The procedure described in Example 40 is repeated, but using an equimolar amount of one of the amines shown in column 2 in the above Table 1 instead of 6.06 parts of an amine of the formula (103). Analogous dyes which dye cotton in the colour shades shown in column 3 in Table 1 are obtained.

The procedure described in Example 40 is repeated, but using an equimolar amount of one of the following diamines instead of 44.4 parts of 1,2-diaminopropane. Analogous dyes are obtained:

Diamine

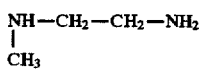

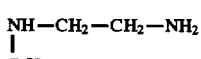

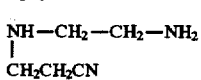

Diamine -continued

NH—CH₂—CH₂—NH₂
|
CH₂CH₂OH

NH—CH₂—CH₂—CH₂—NH₂
|
CH₃

NH—CH₂—CH₂—CH₂—NH₂
|
C₂H₅

NH—CH₂—CH₂—CH₂—NH₂
|
CH₂CH₂OH

NH—CH₂—CH₂—CH₂—NH₂
|
CH₂CH₂CN

HN⟨   ⟩NH

CH₃
          |
H₂N—CH₂—C—NH₂
          |
          CH₃

H₂N—CH₂—CH₂—CH₂—CH—CH₂—NH₂
                    |
                    CH₃

H₂N—(CH₂)₂—O—(CH₂)₂—O—(CH₂)₂—NH₂

Analogous dyes are obtained if the procedure described in one of Examples 41 to 78 is repeated, but using an equimolar amount of one of the above diamines instead of 44.4 pads of 1,2-diaminopropane.

EXAMPLES 79 to 101

Analogous dyes are obtained, if the procedure described in Example 1 is repeated, but using an equimolar amount of an amine of the formula $D_1$—NH₂, in which $D_1$ is as defined in column 2 in the following Table 2, instead of 101.2 parts of aniline-2,4-disulfonic acid.

TABLE 2

| Ex. | $D_1$ |
|---|---|
| 79 | —C₆H₄—SO₂—CH₂CH₂—OSO₃H |
| 80 | 2-HO₃S, 5-(SO₂—CH₂CH₂—OSO₃H)-phenyl |
| 81 | 1-SO₃H, naphthyl-(SO₂—CH₂CH₂—OSO₃H) |
| 82 | 4-SO₃H-phenyl, NH—CO—CH(Br)—CH₂—Br |
| 83 | 2,4-di-SO₃H-phenyl, NH—CO—CH(Br)—CH₂—Br |
| 84 | 4-SO₃H-phenyl, NH—CO—C(Br)=CH₂ |
| 85 | 2,4-di-SO₃H-phenyl, NH—CO—C(Br)=CH₂ |
| 86 | 2,5-di-SO₃H-phenyl, NH—CO—CH(Br)—CH₂—Br |
| 87 | 4-SO₃H-phenyl-NH—C(=N—)—N=C(Cl)—N=C(NH₂)— (triazine) |
| 88 | 2,4-di-SO₃H-phenyl-NH—C(=N—)—N=C(Cl)—N=C(NHC₂H₅)— (triazine) |

TABLE 2-continued

| Ex. | D₁ |
|---|---|
| 89 | 3-sulfophenyl-NH-C(=N)-[4-chloro-6-(phenylamino)-1,3,5-triazin-2-yl] |
| 90 | 2,4-disulfophenyl-NH-C(=N)-[4-chloro-6-morpholino-1,3,5-triazin-2-yl] |
| 91 | 2,5-disulfophenyl-NH-C(=N)-[4-chloro-6-amino-1,3,5-triazin-2-yl] |
| 92 | 2,5-disulfophenyl-NH-C(=N)-[4-chloro-6-(ethylamino)-1,3,5-triazin-2-yl] |
| 93 | 2,5-disulfophenyl-NH-C(=N)-[4-chloro-6-(phenylamino)-1,3,5-triazin-2-yl] |
| 94 | 2,5-disulfophenyl-NH-C(=N)-[4-chloro-6-morpholino-1,3,5-triazin-2-yl] |
| 95 | 2,5-disulfo-4-methylphenyl |
| 96 | 2,5-disulfo-4-methylphenyl (CH₃) |
| 97 | 4-chloro-2,5-disulfophenyl |
| 98 | 2-methylnaphthalene-1,5-disulfonic acid |
| 99 | 6-methylnaphthalene-1,3,6-... (SO₃H positions) |
| 100 | methylnaphthalene trisulfonic acid |
| 101 | 2-methylnaphthalene-1,5-disulfonic acid |

The procedure described in one of Examples 79 to 101 is repeated, but using an equimolar amount of one of the following diamines instead of 44.4 parts of 1,2-diaminopropane. Analogous dyes are obtained:

Diamine

NH—CH₂—CH₂—NH₂
|
CH₃

NH—CH₂—CH₂—NH₂
|
C₂H₅

NH—CH₂—CH₂—NH₂
|
CH₂CH₂CN

NH—CH₂—CH₂—NH₂
|
CH₂CH₂OH

NH—CH₂—CH₂—CH₂—NH₂
|
CH₃

NH—CH₂—CH₂—CH₂—NH₂
|
C₂H₅

NH—CH₂—CH₂—CH₂—NH₂
|
CH₂CH₂OH

NH—CH₂—CH₂—CH₂—NH₂
|
CH₂CH₂CN

HN⟨  ⟩NH

CH₃
         |
H₂N—CH₂—C—NH₂
         |
         CH₃

H₂N—CH₂—CH₂—CH₂—CH—CH₂—NH₂
                    |
                    CH₃

H₂N—(CH₂)₂—O—(CH₂)₂—O—(CH₂)₂—NH₂

Dyeing instructions 2 parts of the reactive dye obtained according to Example 1 are dissolved in 400 parts of water; 1500 parts of a solution which comprises 53 g of sodium chloride per liter are added. 100 parts of cotton fabric are introduced into this dyebath at 40° C. After 45 minutes, 100 parts of a solution which comprises 16 g of sodium hydroxide and 20 g of calcined sodium carbonate per liter are added. The temperature of the dyebath is kept at 40° C. for a further 45 minutes. Thereafter, the dyed goods are rinsed, soaped at the boil for a quarter of an hour with a nonionic detergent, rinsed again and dried.

Printing instructions 3 parts of the reactive dye obtained according to Example 1 are sprinkled, with rapid stirring, into 100 parts of a stock thickener comprising 50 parts of 5% sodium alginate thickener, 27.8 parts of water, 20 parts of urea, 1 part of sodium m-nitro-benzenesulfonate and 1.2 parts of sodium bicarbonate. A cotton fabric is printed with the printing paste thus obtained and dried and the resulting printed material is steamed in saturated steam at 102° C. for 2 minutes. The printed fabric is then rinsed, soaped at the boil, if appropriate, and rinsed again and then dried.

What is claimed is:
1. A reactive dye of the formula

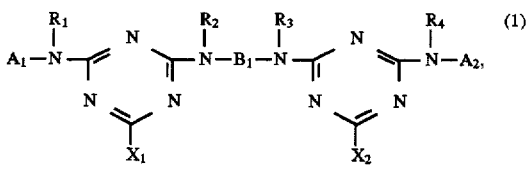

in which $R_1$, $R_2$, $R_3$ and $R_4$ independently of one another are hydrogen or substituted or unsubstituted $C_1$–$C_4$alkyl, $X_1$ and $X_2$ are halogen, $B_1$ is $C_2$–$C_{12}$alkylene which is uninterrupted or is interrupted by 1, 2 or 3 members from the group consisting of —NH—, —N(CH₃)— or —O—, and is unsubstituted or substituted by hydroxyl, sulfo, sulfato, cyano or carboxyl; $C_5$–$C_9$cycloalkylene which is unsubstituted or substituted by $C_1$–$C_4$alkyl, $C_1$–$C_4$alkoxy, $C_2$–$C_4$alkanoylamino, sulfo, halogen or carboxyl; methylene-cyclohexylene-methylene which is unsubstituted or substituted in the cyclohexylene ring by $C_1$–$C_4$alkyl; $C_1$–$C_6$alkylenephenylene or phenylene which are unsubstituted or substituted by $C_1$–$C_4$alkyl; $C_1$–$C_4$alkoxy, $C_2$–$C_4$alkanoylamino, sulfo, halogen or carboxyl; or a radical of the formula

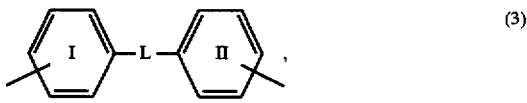

in which the benzene rings I and II are unsubstituted or substituted by $C_1$–$C_4$alkyl, $C_1$–$C_4$alkoxy, $C_2$–$C_4$alkanoylamino, sulfo, halogen or carboxyl and L is a direct bond or a $C_2$–$C_{10}$alkylene radical, which is uninterrupted or is interrupted or is interrupted by 1, 2 or 3 oxygen atoms, or L is a bridge member of the formula —CH=CH—, —N=N—, —NH—, —CO—, —NH—CO—, —NH—CO—NH—, —O—, —S— or —SO₂—, or the radical of the formula —N(R₂)—B₁—N(R₃)— is a piperazine radical, A₁ is the radical of a monoazo, polyazo, metal complex azo, anthraquinone, phthalocyanine, formazan or dioxazine chromophore and, A₂ is a radical of the formula

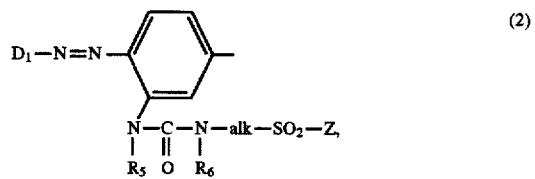

in which

D₁ is substituted or unsubstituted phenyl or naphthyl,

R₅ and R₆ independently of one another are hydrogen or substituted or unsubstituted $C_1$–$C_4$alkyl, alk is substituted or unsubstituted $C_2$–$C_6$alkylene and Z is vinyl or a radical —CH₂—CH₂—U₁, and U₁ is —Cl, —Br, —F, —OSO₃H, —SSO₃H, —OCO—CH₃, —OPO₃H₂, —OCO—C₆H₅, —OSO₂—C₁–C₄alkyl or —OSO₂—N(C₁–C₄alkyl)₂, and the radicals A₁ and A₂ differ from one another.

2. A reactive dye according to claim 1, wherein $R_1$, $R_2$, $R_3$, $R_4$, $R_5$ and $R_6$ independently of one another are hydrogen or $C_1$–$C_4$alkyl which is unsubstituted or substituted by hydroxyl, sulfo, sulfato, cyano or carboxyl.

3. A reactive dye according to claim 1, wherein $R_1$, $R_4$, $R_5$ and $R_6$ are hydrogen.

4. A reactive dye according to claim 1, wherein $X_1$ and $X_2$ are chlorine or fluorine.

5. A reactive dye according to claim 1, wherein $B_1$ is a $C_2$–$C_{12}$alkylene radical, which is uninterrupted or is be interrupted by 1, 2 or 3 members from the group consisting of —NH—, —N(CH$_3$)— or —O— and is unsubstituted or substituted by hydroxyl, sulfo, sulfato, cyano or carboxyl; or a $C_5$–$C_9$cycloalkylene radical, $C_1$–$C_6$alkylenephenylene radical or phenylene radical which are unsubstituted or substituted by $C_1$–$C_4$alkyl, $C_1$–$C_4$alkoxy, $C_2$–$C_4$alkanoylamino, sulfo, halogen or carboxyl; or a radical of the formula

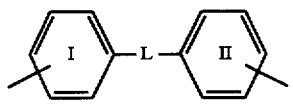
(3)

in which
the benzene rings I and II are unsubstituted or substituted by $C_1$–$C_4$alkyl, $C_1$–$C_4$alkoxy, $C_2$–$C_4$alkanoylamino, sulfo, halogen or carboxyl and
L is a direct bond or a $C_2$–$C_{10}$alkylene radical, which is uninterrupted or is be interrupted by 1, 2 or 3 oxygen atoms, or
L is a bridge member of the formula —CH=CH—, —N=N—, —NH—, —CO—, —NH—CO—, —NH—CO—NH—, —O—, —S— or —SO$_2$—; or
the radical of the formula —N(R$_2$)—B$_1$—N(R$_3$)— is a piperazine radical of the formula

6. A reactive dye according to claim 1, wherein $B_1$ is a $C_2$–$C_{12}$alkylene radical, which is uninterrupted or is be interrupted by 1, 2 or 3 members —O— and is unsubstituted or substituted by hydroxyl.

7. A reactive dye according to claim 1, wherein $B_1$ is a radical of the formula —CH$_2$—CH(R$_7$)— or —(R$_7$)—CH—CH$_2$—, in which
$R_7$ is $C_1$–$C_4$alkyl.

8. A reactive dye according to claim 1, wherein alk is a $C_1$–$C_3$alkylene radical and
Z is vinyl or a radical of the formula —CH$_2$—CH$_2$—OSO$_3$H.

9. A reactive dye according to claim 1, wherein $D_1$ is phenyl or naphthyl which are unsubstituted or substituted by $C_1$–$C_4$alkyl, $C_1$–$C_4$ alkoxy, $C_2$–$C_4$alkanoylamino, sulfo, halogen, carboxyl or a fibre-reactive radical.

10. A reactive dye according to claim 1, wherein $A_1$ is a radical of the formula

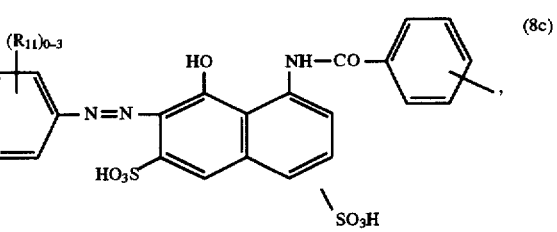

in which
$(R_{11})_{0-3}$ is 0 to 3 identical or different substituents from the group consisting of $C_1$–$C_4$alkyl, $C_1$–$C_4$alkoxy, halogen, carboxyl and sulfo and
Z is as defined in claim 1, in which
$(R_{11})_{0-3}$ is as defined above,

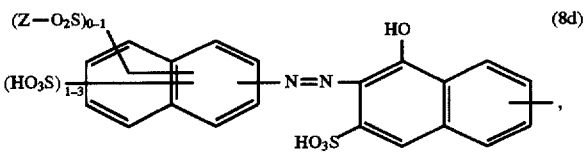

in which
$(R_{11})_{0-3}$ is as defined above,

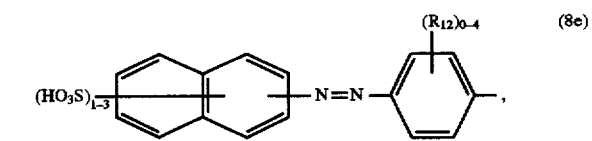

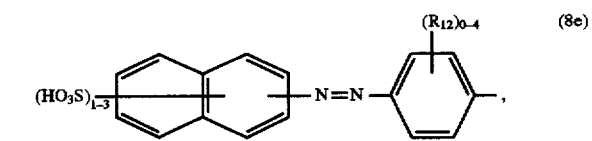

in which
$(R_{12})_{0-4}$ is 0 to 4 identical or different substituents from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo and Z is as defined in claim 1,

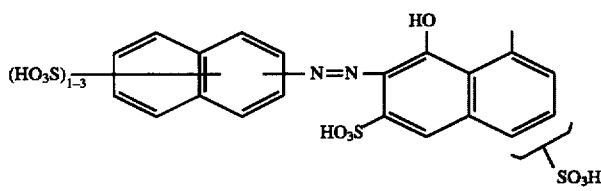 (8f)

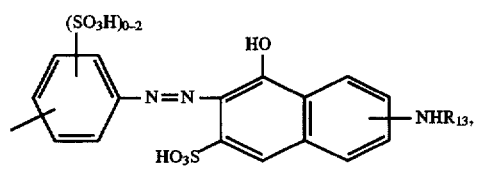 (8g)

in which

R$_{13}$ is C$_1$–C$_4$alkanoyl, benzoyl or a halotriazinyl radical which is unsubstituted or further substituted,

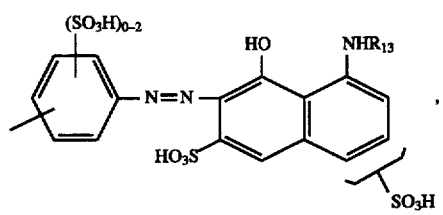 (8h)

in which

R$_{13}$ is C$_1$–C$_4$alkanoyl, benzoyl or a halotriazinyl radical which is unsubstituted or further substituted,

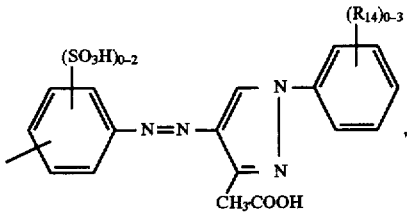 (8i)

in which (R$_{14}$)$_{0-3}$ is 0 to 3 identical or different substituents from the group consisting of C$_1$–C$_4$alkyl, C$_1$–C$_4$alkoxy, halogen, carboxyl and sulfo,

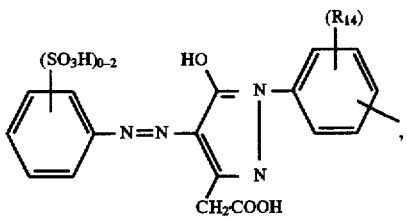 (8j)

in which (R$_{14}$)$_{0-3}$ is as defined above,

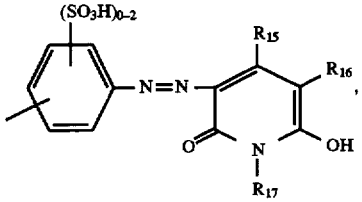 (8k)

in which

R$_{15}$ and R$_{17}$ independently of one another are hydrogen, C$_1$–C$_4$alkyl or phenyl, and R$_{16}$ is hydrogen, cyano, carbamoyl or sulfomethyl.

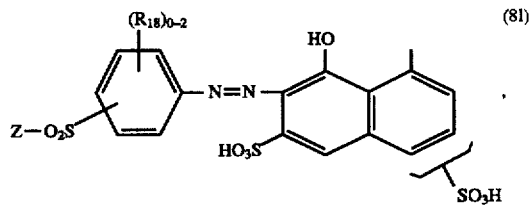 (8l)

in which (R$_{18}$)$_{0-2}$ is 0 to 2 identical or different substituents from the group consisting of C$_1$–C$_4$alkyl, C$_1$–C$_4$alkoxy, halogen, carboxyl and sulfo, and Z is as defined in claim 1.

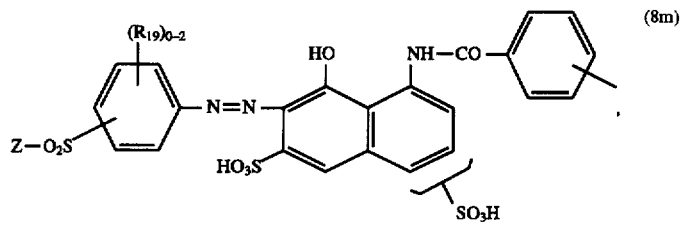

(8m)

in which (R$_{19}$)$_{0-2}$ is 0 to 2 identical or different substituents from the group consisting of C$_1$–C$_4$alkyl, C$_1$–C$_4$alkoxy, halogen, carboxyl and sulfo; and Z is as defined in claim 1,

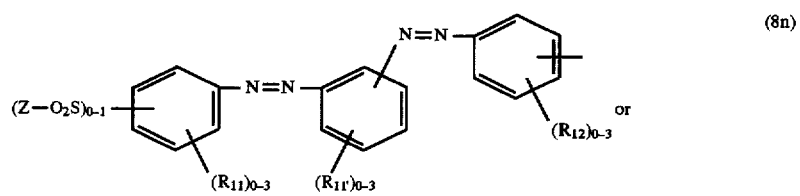

(8n)

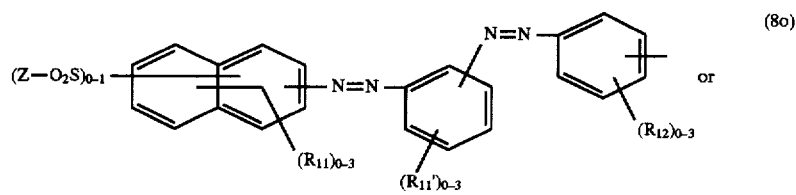

(8o)

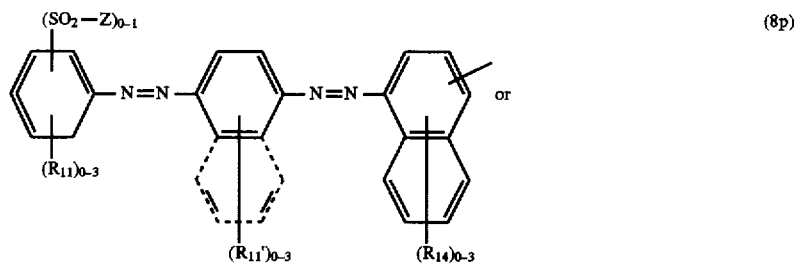

(8p)

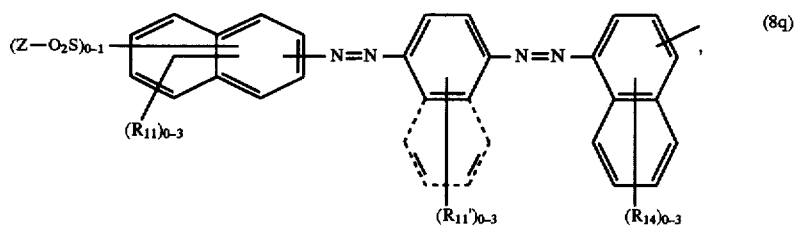

(8q)

in which (R$_{11}$)$_{0-3}$, (R$_{12}$)$_{0-3}$, (R$_{14}$)$_{0-3}$ and Z are in each case as defined above and (R$_{11}$)$_{0-3}$ is 0 to 3 identical or different substituents from the group consisting of C$_1$–C$_4$alkyl, C$_1$–C$_4$alkoxy, halogen, carboxyl and sulfo,

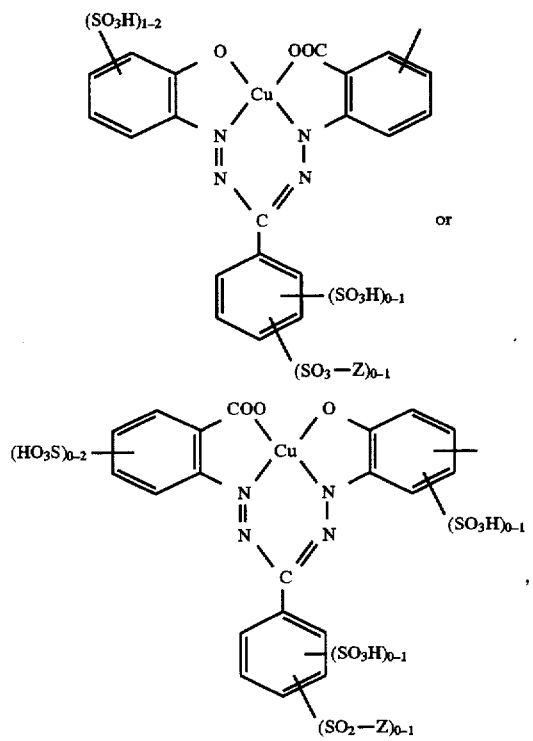

(8r)

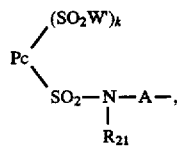

(8s)

in which

Z is as defined above and the benzene nuclei contain no further substituents or are further substituted by $C_1$–$C_4$alkyl, $C_1$–$C_4$alkoxy, $C_1$–$C_4$alkylsulfonyl, halogen or carboxyl,

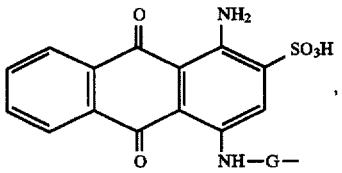

(9)

in which

Pc is the radical of a metal phthalocyanine;

W' is —OH and/or —$NR_{20}R_{20}'$;

$R_{20}$ and $R_{20}'$ independently of one another are hydrogen or $C_1$–$C_4$alkyl which is unsubstituted or substituted by hydroxyl or sulfo;

$R_{21}$ is hydrogen or $C_1$–$C_4$alkyl;

A is a phenylene radical which is unsubstituted or substituted by $C_1$–$C_4$alkyl, halogen, carboxyl or sulfo, or a $C_2$–$C_6$alkylene radical; and k is 1 to 3,

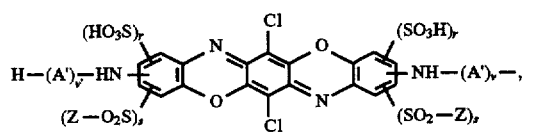

(10)

in which

A' is a phenylene radical which is unsubstituted or substituted by $C_1$–$C_4$alkyl, halogen, carboxyl or sulfo, or a $C_2$–$C_6$alkylene radical, r, s, v and v' independently of one another are each the number 0 or 1 and Z is as defined above, or

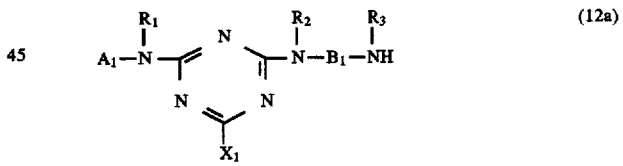

(11)

in which

G is a phenylene radical which is unsubstituted or substituted by $C_1$–$C_4$alkyl, $C_1$–$C_4$alkoxy, halogen, carboxyl or sulfo, or a cyclohexylene, phenylenemethylene or $C_2$–$C_6$alkylene radical.

11. A reactive dye according to claim 10, wherein $A_1$ is a radical of the formulae (8a) to (8q) or a radical of the formula (11).

12. A reactive dye according to claim 1, wherein one of the radicals $R_2$ and $R_3$ is $C_1$–$C_4$alkyl which is substituted by hydroxyl, sulfo, sulfato, cyano or carboxyl and the other of the radicals $R_2$ and $R_3$ is hydrogen or $C_1$–$C_4$alkyl.

13. A reactive dye according to claim 10, wherein $R_1$, $R_2$, $R_3$, $R_4$, $R_5$ and $R_6$ are hydrogen, $X_1$ and $X_2$ are chlorine or fluorine, $B_1$ is a radical of the formula —$CH_2$—$CH(R_7)$— or —($R_7$)—CH—$CH_2$—, in which $R_7$ is $C_1$–$C_4$alkyl, alk is a $C_1$–$C_3$alkylene radical, Z is vinyl or a radical of the formula —$CH_2$—$CH_2$—$OSO_3H$, and $D_1$ is phenyl or naphthyl which are unsubstituted or substituted by $C_1$–$C_4$alkyl, $C_1$–$C_4$alkoxy, $C_2$–$C_4$alkanoylamino, sulfo, halogen, carboxyl or a fibre-reactive radical.

14. A process for the preparation of a reactive dye according to claim 1, which comprises subjecting a compound of the formula

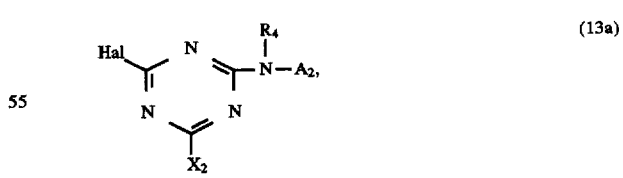

(12a)

to a condensation reaction with a compound of the formula

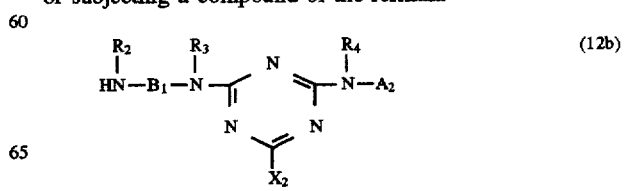

(13a)

or subjecting a compound of the formula (12b)

$$HN-B_1-N \begin{array}{c} R_2 \\ | \end{array} \begin{array}{c} R_3 \\ | \end{array} \begin{array}{c} N \\ \end{array} \begin{array}{c} R_4 \\ | \end{array} N-A_2$$

to a condensation reaction with a compound of the formula
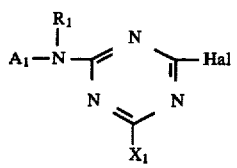
(13b)
in which
Hal is halogen, and
$A_1$, $A_2$, $B_1$, $X_1$, $X_2$, $R_1$, $R_2$, $R_3$ and $R_4$ are as defined in claim 1.
15. A process for dyeing or printing fibre material containing hydroxyl groups or containing nitrogen, which process comprises applying to said fibre material a tinctorial amount of a reactive dye according to claim 1.
* * * * *